(12) United States Patent
Montagu

(10) Patent No.: US 6,531,864 B2
(45) Date of Patent: Mar. 11, 2003

(54) HIGH TORQUE ELECTROMAGNETIC DEVICES

(76) Inventor: Jean I. Montagu, 76 Walnut Pl., Brookline, MA (US) 02146

( * ) Notice: Subject to any disclaimer, the term of this patent is extended or adjusted under 35 U.S.C. 154(b) by 0 days.

(21) Appl. No.: 09/780,586

(22) Filed: Feb. 8, 2001

(65) Prior Publication Data

US 2002/0008508 A1 Jan. 24, 2002

Related U.S. Application Data

(60) Provisional application No. 60/181,274, filed on Feb. 9, 2000.

(51) Int. Cl.$^7$ ................................................. G01R 1/20
(52) U.S. Cl. ........................ 324/146; 336/232; 324/144
(58) Field of Search .................. 324/146, 144, 324/147, 151 R, 154 R, 156, 152, 155; 359/213; 336/232; 310/36

(56) References Cited

U.S. PATENT DOCUMENTS 4,845,424 A * 7/1989 Gamble ..................... 324/146
5,424,632 A * 6/1995 Montagu ..................... 324/146
5,781,093 A * 7/1998 Grandmont et al. ......... 336/232
6,292,085 B1 * 9/2001 Cho ............................ 336/200

* cited by examiner

Primary Examiner—Edward Lefkowitz
Assistant Examiner—Subhash Zaveri
(74) Attorney, Agent, or Firm—Philip L. McGarrigle; Alan B. Sherr; Ivan D. Zitkovsky

(57) ABSTRACT

A high torque electromagnetic device such as a moving magnet galvanometer includes a composite electromagnetic coil. The composite electromagnetic coil includes two pancake-shaped coil parts made using a rectangular conductor having a width and a thickness, wherein the winding formed for each pancake-shaped coil part has the width oriented in a direction substantially normal to the initially flat face of the pancake-shaped coil part. Each pancake-shaped coil part is subsequently shaped to a shape different from the initially flat shape. The coil parts are superposed and electrically connected to form a single tightly packed unit.

24 Claims, 7 Drawing Sheets

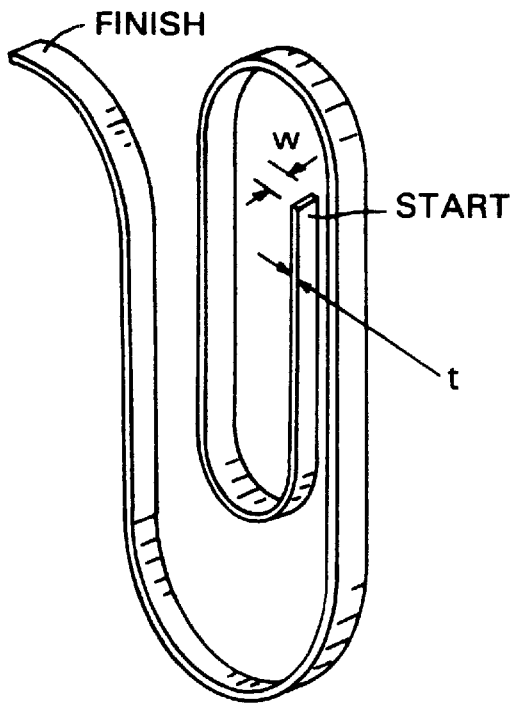
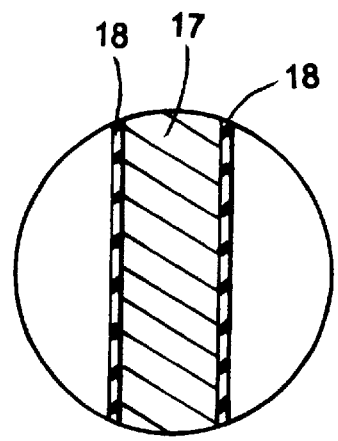
FIG. 4
FIG. 4D
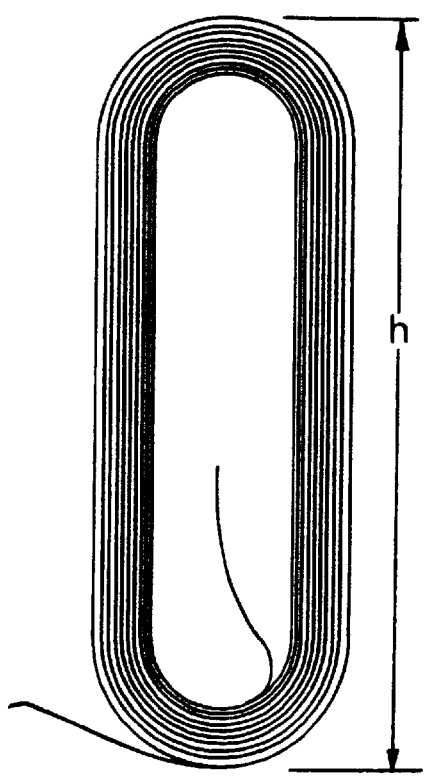
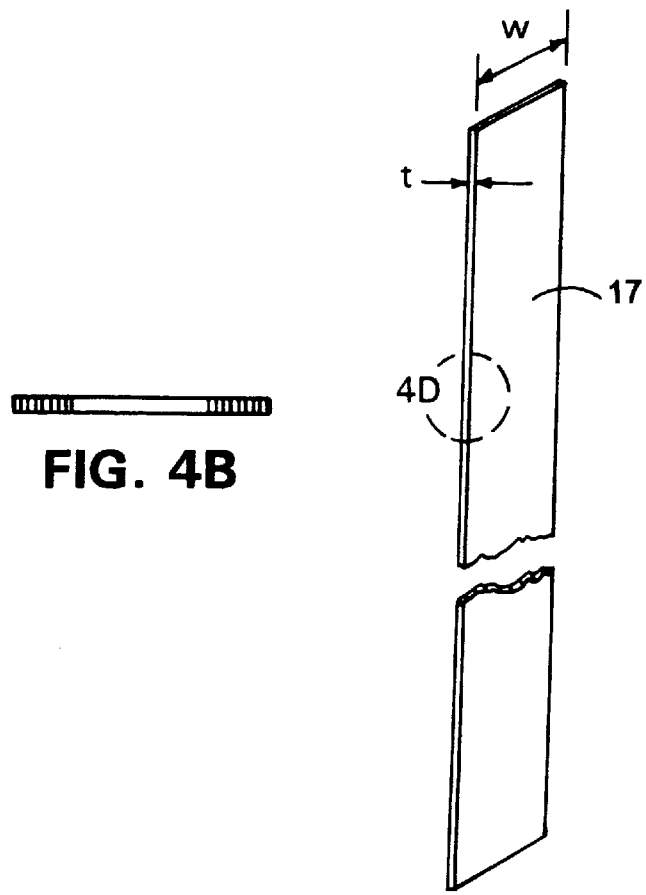
FIG. 4A
FIG. 4B
FIG. 4C

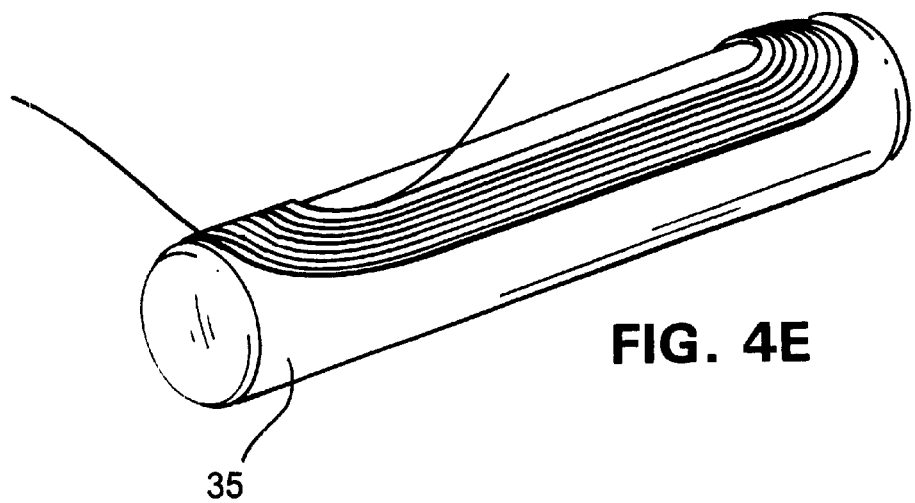
FIG. 4E
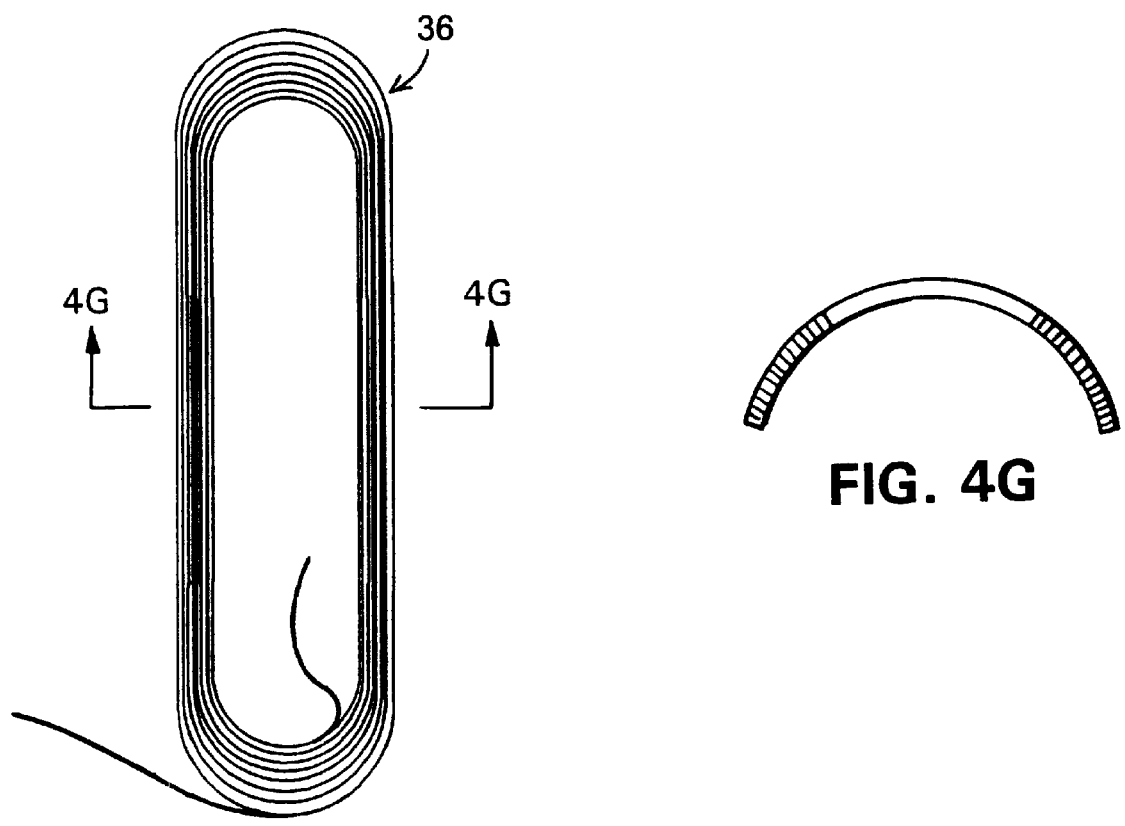
FIG. 4F
FIG. 4G

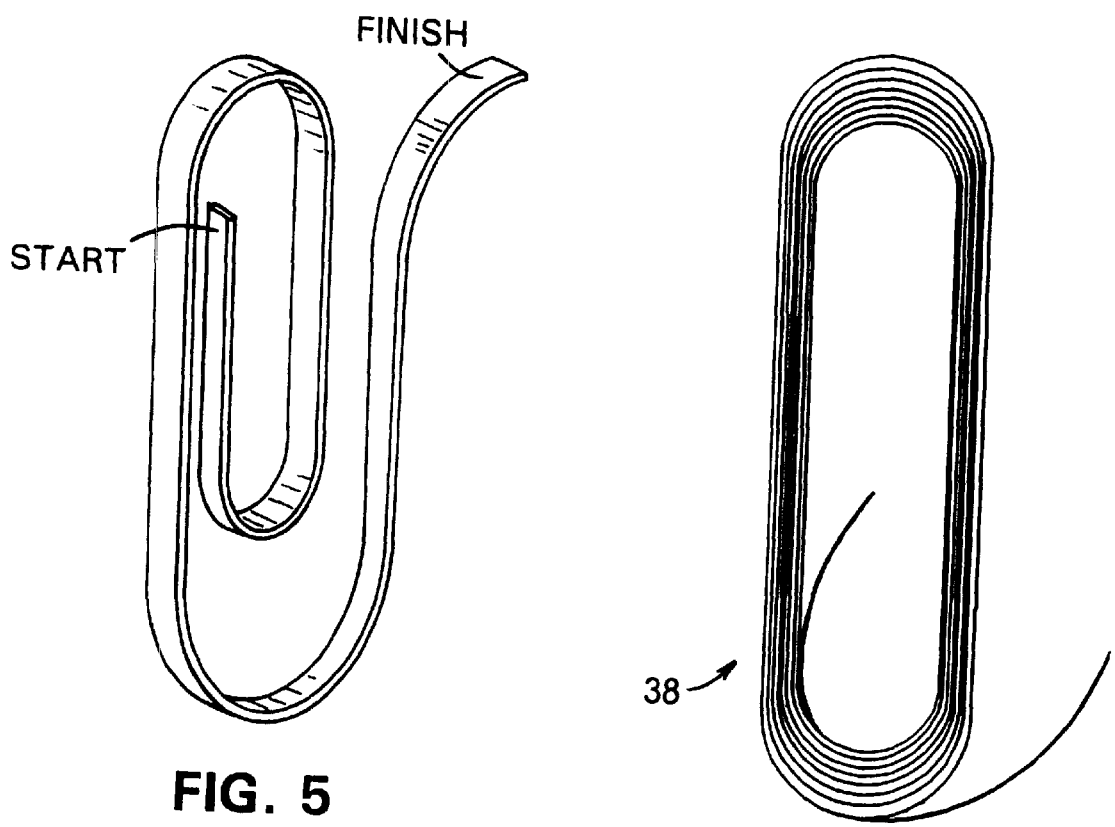
FIG. 5
FIG. 5A
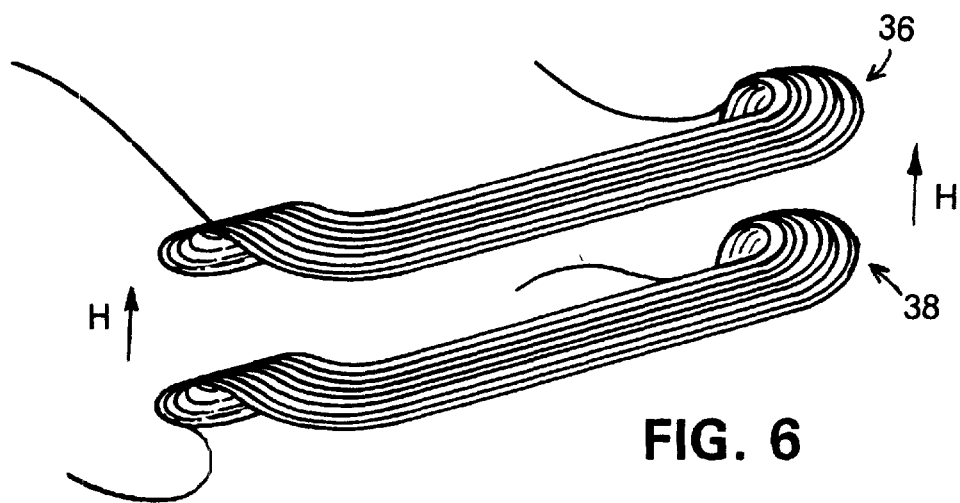
FIG. 6

HIGH TORQUE ELECTROMAGNETIC DEVICES

This application claims priority from U.S. Provisional Patent Application Ser. No. 60/181,274 filed on Feb. 9, 2000, which is incorporated by reference for all purposes.

BACKGROUND OF THE INVENTION

Electromagnetic devices, in general, have coils made of insulated conductors for creating magnetic fields by electrical currents. The electrical resistance of the conductors causes heat to be generated within the conductors and thus throughout the mass of the coils. Depending on the use, the coils may include encapsulation materials that provide thermal conductivity for removing heat generated by currents flowing in the coils and may provide rigidity for preventing their insulation abrasion. For example, such coils are used in electric motors, loud speakers, scanners, torque motors, recording heads for VCR's, computer memories, inductors, etc.

In general, electric motors transform electrical energy into mechanical energy. Every electric motor has a rotor that in most cases includes a moving part, and has a stator. A stator is made of a magnetic material and electrical conductors for establishing and shaping magnetic fields that interact with a rotor.

Galvanometers are frequently called torque motors since they can provide large torque. Mainly, there are three types of galvanometers, that is, the moving coil or so-called D'Arsonval galvanometers, the moving iron galvanometers and the moving magnet galvanometers. While the present invention is applicable to various electric devices, it is illustrated on moving magnet torque motors that have a moving magnet rotor, i.e., the rotating armature that defines the field, and a stationary coil.

Among other parameters, torque motors are characterized by the torque to inertia ratio, which expresses the acceleration capability, the electrical time constant, which burdens the drive electronics, and the first uncontrollable resonant frequency, which limits the stability of a servo system involving the motor. Over the last two decades, improved magnetic materials have been used to improve the performance of torque motors.

The stationary coil of a stator also affects the performance of torque motors. In general, coils include conductors of different shapes, distribution, resistivity, thickness of their electrical insulation, the thermal conductivity of their insulation and their encapsulating compound. For these reasons the torque motors are greatly affected by packing efficiency of the coil conductors. The packing efficiency is defined as the ratio of the volume (or cross-sectional area allocated for the coil) to the volume (or cross-sectional area) of the conductor. The conductors are typically made of copper, but in critical applications, a lower resistance material such as silver may be used.

Different manufacturers supply magnet wires with a high quality insulation material (or coating) that is thin, has uniform high temperature properties and is resistant to abrasion. There are also magnet wires with self-adhesive coatings, whose adhesive property is promoted by heat or the application of alcohol or the like, when forming the coils.

Regular winding processes (i.e., layer winding) optimize the packing density of the wires. The theoretical packing density of round cross-section conductors and very large coils can be as high as 90%. However, most layer-wound coils rarely achieve an 85% packing density for simple shapes such as in solenoids. Most motor coils yield a density close to 70%. This density can be increased after winding by compressing the coil to deform and compact the conductors together. U.S. Pat. Nos. 3,348,183; 3,528,171 and 4,543,708 list packing and thermal benefits obtained generally and specifically with electric motors. Square or rectangular wire cross-sectional shapes may offer higher packing density, as used in inductors and loud speakers.

Theoretically, square or rectangular shapes can be wound with a density of 100%. However, such density is only reached with extremely simple coil shapes or for hand-assembled magnets such as used for quadrupole magnetic lenses or cyclotron type applications. Complex coils are not efficiently wound with square or rectangular conductors because it is extremely difficult to control the consistency of the formation of the layers of the conductor. An additional difficulty is raised with rectangular conductors, of high aspect ratios, as they do not bend in the cross-dimension without compromising the insulation on their exterior.

SUMMARY OF THE INVENTION

The present invention relates to coils for electric devices, such as electric motors, loud speakers, scanners, recording heads for VCR's or inductors, and to methods of making the coils. The present invention relates to torque motors such as moving magnet galvanometers and methods of making the same.

According to one aspect, an electric device employs a composite electromagnetic coil including two pancake-shaped coil parts (i.e., windings) made of a rectangular or ribbon wire, wherein the wide-dimension of the ribbon cross-section extends normal to the face of the pancake. The composite electromagnetic coil includes the two pancake coil parts pre-shaped, superposed and connected to form a single tightly packed unit.

Preferably, the electric device may be a torque motor. The torque motor may be a moving magnet galvanometer. In general, the pancakes of the composite coil are in a deformed state conforming to a predetermined space in which they are to be installed. Preferably, the pancake coil parts of the composite coil are in a deformed state conforming to the shape of the stator or rotor or both. The pancake coil parts may have an elongated form in the direction parallel to the axis of the rotor. The cross-section of the rectangular or ribbon wire is in the range from about 1 to 1 to about 1 to 6 or more. Preferably, the cross-section of the rectangular or ribbon wire is in the range from about 1 to 3 to about 1 to 5. The wire carries on its exterior an activatible adhesive that helps the fabrication process.

According to another aspect, a method for making a composite electromagnetic coil includes winding two pancake-shaped coil parts made of a rectangular or ribbon wire, wherein the wide-dimension of the ribbon cross-section extends normal to the face of the pancake. The method also includes forming each pancake coil part to a selected shape, superposing the two coil parts and electrically connecting them to form a single tightly packed unit.

Preferably, each coil part is shaped to conform to the shape of a stator or a rotor of an electric motor. The winding of each pancake coil part may include forming a flat coil elongated in the direction parallel to the axis of a rotor of a torque motor, such as a moving magnet galvanometer. The two coil parts are shaped separately prior to joining them together. The method may include potting the two coil parts together.

According to yet another aspect, a method for making a composite electromagnetic drive coil for a moving magnet galvanometer includes winding two flat pancake-shaped coil parts using a rectangular conductor having a width and a thickness, wherein each pancake-shaped coil part has the width oriented in a direction substantially normal to a face of the pancake-shaped coil part. The method includes forming each pancake-shaped coil part to a selected shape different from an initially flat shape, superposing the two coil parts; and electrically connecting the superposed coil parts to form a single tightly packed unit. The method may also include potting the superposed coil parts.

Preferably, the method includes employing one cylindrical mandrel for each of the coil parts resulting in a slightly different shape. The different shape enables optimal packing of the two coil parts. The superposing includes aligning the coil parts in an orientation that adds their magnetic fields together. The connecting is performed between inner turns of each of the coil parts to locate a connection within the bounds of the composite coil without crossing.

According to yet another aspect, an electromagnetic coil is formed from two or more windings (i.e., coil parts) of a ribbon-shaped or rectangularly-shaped conductor, and preferably an even number of the windings. Each winding can be made as a flat pancake or a two layer pancake, and then shaped to a semi-cylindrical, semi-circular, semi-elliptical or another shape. Two or more windings are superposed, one above the other, in a way that preferably adds the magnetic field. In general, the coil superposition may be used to "shape" the resulting magnetic field, including partial addition and subtraction.

The present methods may be used to form multi-layer coils having complex shapes, wherein the coils are formed using a ribbon-shaped or rectangularly-shaped conductor, having a moderate aspect ratio such as 3, 4 or 5 to 1. These coils can be wound and formed successfully in a very convenient and low-cost manner. The suitability of such multi-layer coils is dictated by the application, the power supply voltage, and the selected driver.

Preferably, a composite electromagnetic coil for a moving magnet galvanometer is made from two pancake ribbon coil parts. The coil parts are shaped to have a semi-cylindrical shape, are then generally aligned edge to edge, and their inner ends in the inner space of the winding is electrically connected. The two assembled coil parts are potted together. The resulting composite coil has a semi-cylindrical form complementing the form of magnetic materials of the stator and the rotor. A moving magnet galvanometer uses two such composite coils, as the drive coils, that are preferably potted together to form one unit. This unit has a relatively low ratio of insulation to conductor for a given resistance, and good radial heat conductivity.

In torque motors where exceptionally high acceleration is required, the composite coils provide for a selected magnetic field and heat conductivity that keeps the torque motor from overheating. The composite coils also maximize the conductive packing density, which is important because, all other features being equal, the power conception of such devices is directly proportional to the section or volume of conductor in the coil. The power consumption (P) depends on the following relationship:

$$P = I^2 \cdot R = I^2 \cdot \rho \cdot L \cdot N^2 / A$$

wherein I=Current in the coil
R=Resistivity of the coil
$\rho$=Specific resistance of the material of the wire
L=Length of one turn of the conductor N=Number of turns
A=the total cross-section of the coil The temperature of the coil rises faster than the power increases because the resistivity of copper for instance rises with temperature. In degree centigrade it is:

$$R_T = R_{20}(1 + 0.0393 \cdot \Delta T)$$

The radial dimension of the coil of a moving magnet scanning galvanometer is desirably as small as possible because, as the magnetic field is determined by the diameter of the magnet-armature, the diameter of the magnet-armature determines the inertia of the armature and consequently the dynamic performance of the device.

The composite coils provide good access to both the start and the end of a coil. Furthermore, the winding method of the invention eliminates overlap of the start leads, which normally would add undesirable thickness to the winding without contributing to the magnetic field and thus decreasing the packing efficiency.

The volume efficiency of a rectangular wire is about 75%, which compares favorably with that of a round wire, which rarely reaches about 60%, while 50% may be viewed as realistic for rotors. (See, for example, "Electromagnetic Devices" by Herbert C. Roters, John Wiley & Sons, Inc.) On the other hand, in coils that use small dimension wires, the volume of the insulation becomes approximately 20% of the total volume. This is representative of single-layer insulation (minimum thickness) round wires commonly used for sub-fractional electric motors or galvanometers, such as 30 gauge (0.010 inch diameter) wire. An equivalent rectangular wire with an aspect ratio of 3 or 4 to 1 is penalized by a further 3%, yielding a copper volume of about 77.5% of the total volume of the conductor.

BRIEF DESCRIPTION OF THE DRAWINGS

FIG. 4 is a perspective view of a single-layer "pancake" winding of a self-adhesive insulated ribbon conductor wound clockwise.

FIG. 4A is a plan view of a "pancake" coil wound as shown in FIG. 4.

FIG. 4B is a transverse cross-sectional view of the coil shown in FIG. 4A,

FIG. 4C illustrates a segment of the ribbon wire used in the coil of FIGS. 4 and 4A.

FIG. 4D is a magnified cross-sectional view of the ribbon conductor of FIG. 4C.

FIG. 4E depicts the "pancake" coil of FIG. 4 located on a forming mandrel after deformation to conform to the exterior shape of the mandrel.

FIG. 4F depicts in a plan view the deformed coil shown in FIG. 4E.

FIG. 4G is a cross-sectional view taken at lines 4G–4G shown in FIG. 4F.

FIG. 5 is a perspective view of a single-layer "pancake" winding of a self-adhesive insulated ribbon conductor wound counter-clockwise.

FIG. 5A is a plan view of a "pancake" coil wound, as shown in FIG. 5, and deformed on the forming mandrel shown in FIG. 4E.

FIG. 6 is a perspective view illustrating the super-position of the coils shown in FIGS. 4F and 5A, as the two coils are assembled.

DESCRIPTION OF THE PREFERRED EMBODIMENTS

Figures 1, 1A:
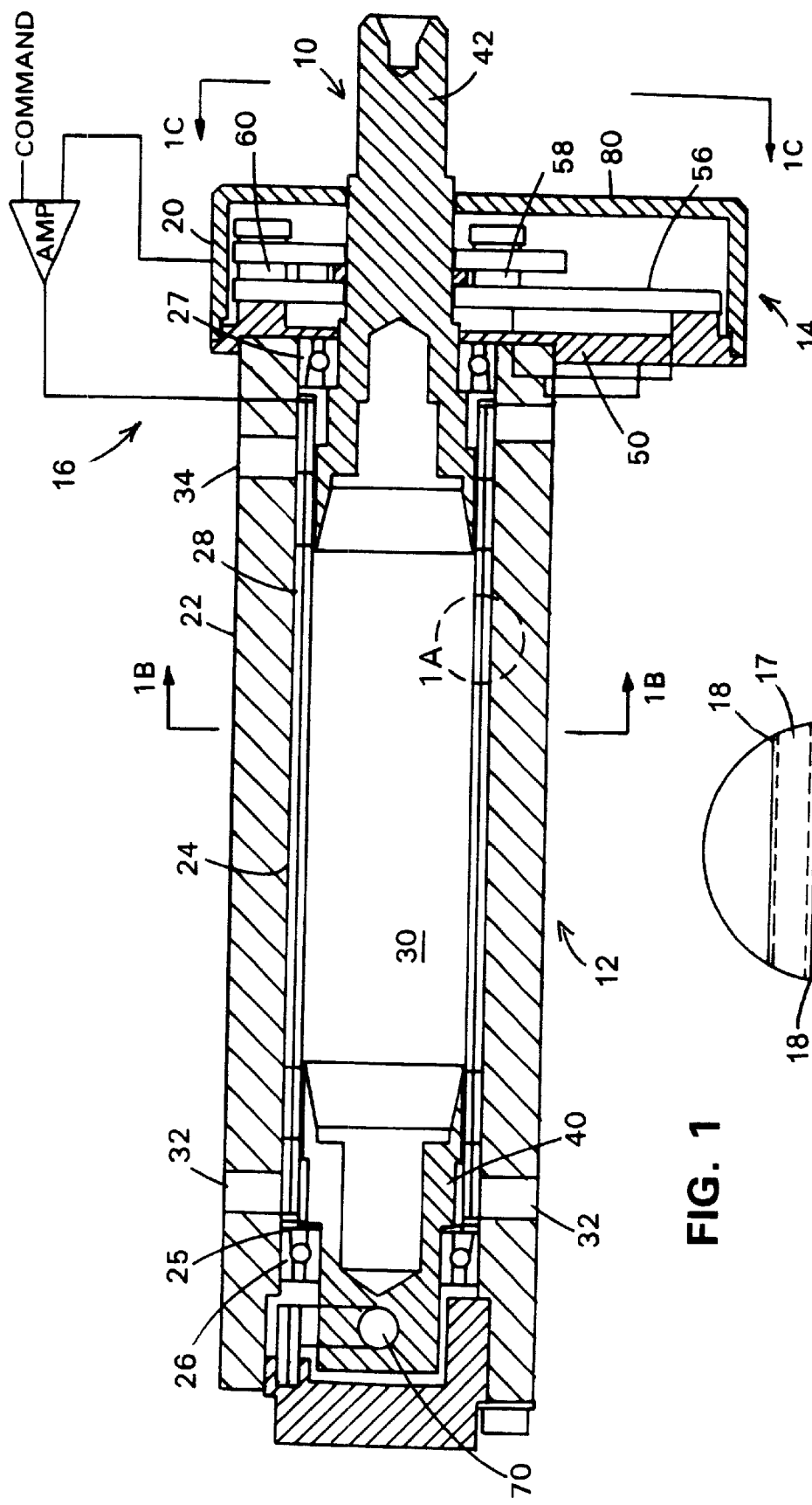
FIG. 1 depicts schematically a closed-loop servo optical scanner showing a cross-sectional view of a galvanometer and a position detector.
FIG. 1A is a magnified view of a portion of FIG. 1 depicting a composite coil including two superposed coils formed by a ribbon conductor.

FIG. 1 shows elements of a galvanometer used for example in a moving magnet optical scanner. The galvanometer includes a rotor 10, a stator 12, a position encoder 14, and an electronic servo control 16. Stator 12 includes an outer sleeve 22, and fixed drive coils 28. Outer sleeve 22 is made of two nearly identical halves, forming a solid cylindrical surface 24, which includes access holes 32 and 34. Holes 32 and 34 are used for impregnation and for attaching drive coils 28 to stator sleeve 22.

Outer sleeve 22 is made of a magnetically permeable material and forms a part of a magnetic structure of the galvanometer. The galvanometer includes a base plate 50 and front bearings 27 restricting the motion of a front shaft 42. At the other end, the galvanometer includes a preload washer 25 and rear bearings 26 restricting the motion of a rear shaft 40. This end also includes a retainer that holds and also captures the stationary part of a limit stop 70.

Rotor 10 (i.e. armature 10) includes a permanent magnet 30 attached to front shaft 42 and rear shaft 40. Permanent magnet 30 has a cylindrical shape with two essentially semi-cylindrical poles on opposite side, as described in U.S. Pat. No. 5,424,632. Permanent magnet 30 is made of neodymium iron boron, samarium cobalt or another suitable magnetic material having high magnetic energy. All elements of armature 10 are, for example, bonded together with epoxy such as Loctite 609 or similar bonding material, as described in U.S. Pat. No. 5,936,324, which is incorporated by reference. The armature may also include a compression spring that bears on the moveable race of one of bearings 26 and 27 and thus provides an axial preload pressure. For example, bearings manufacturer New Hampshire Ball Bearings recommends that its bearing number DDRI-814 (½ inch outside diameter and ¼ inch inside diameter) have a preload of approximately one pound, which may be quite appropriate for also compressing the armature construction.

Front shaft 42 of armature 10 is connected to the movable part of position encoder 14, which preferably is a capacitive transducer described, for example, in U.S. Pat. No. 5,537,109, or U.S. patent application Ser. No. 09/326,374, which is incorporated by reference for all purposes. Alternatively, position transducer 14 may be an Inductosyn, an optical sensor or any other type transducer with a suitable signal-to-noise ratio and bandwidth.

As described in detail below, the galvanometer includes two unique drive coils 28 (shown in FIGS. 2 and 3) initially wound flat and then formed to fit the space between magnet 30 and inner surface 24 of sleeve 22. Referring to FIG. 1A, drive coils 28 have two coil parts shown in cross-section, wherein each coil part is made of a rectangular or ribbon shaped conductor 17 covered by an exterior insulator 18.

FIGS. 4 through 4G show the fabrication of a first coil part using a rectangular or ribbon shaped conductor 17 wound clockwise into a single flat layer (i.e., pancake like layer). Referring to FIG. 4A, the first coil part is wound clockwise to be flat and have a desired height h and the number of turns shown in FIG. 4B. The resistance of conductor 17 depends on the coil material (e.g., Cu, Ag, or another low resistivity material) and the shape of conductor 17, shown in FIG. 4C. In general, a suitable pre-insulated ribbon wire has a low or moderate aspect ratio of the rectangular cross-section.

Preferably, the insulation on the exterior of the wire has a coating of activatable glue. On a bobbin, a flat elongated oval coil is wound, to form the pancake coil having the form of a racetrack. The coil is then inserted into a forming guide and punch set, including a mandrel 35 shown in FIG. 4E. The first coil part 36 (shown in FIGS. 4F and 4G) is formed by compression, in the appropriately formed cavity, where the coil is shaped by a permanent deformation stator to have a semi-cylindrical shape. This semi-cylindrical shape is selected to conform to shape 24 of the stator and account for the size and shape of the second coil part 38 described below.

FIGS. 5 and 5A show the fabrication of a second coil part 38 again using a rectangular or ribbon shaped conductor 17. As shown in FIG. 5, the second coil part is wound counter-clockwise into a single flat layer (i.e., pancake like layer) to have a desired height h and the number of turns. The number of turns of the first coil part and the second coil part may be the same or may differ depending on the desired excitation field. After wound counter-clockwise, the second coil part is also deformed over a shaping mandrel as described above.

Figure 6A:
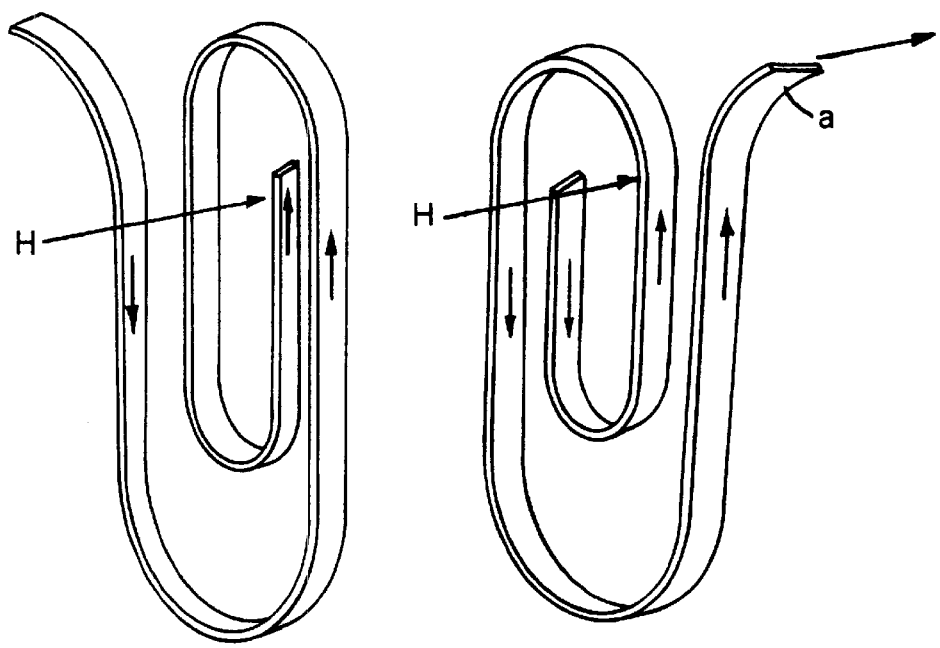
FIG. 6A is a schematic perspective view illustrating the turns of the coils, the current flow and additive magnetic effect induced in the coils shown in FIG. 6.
Figure 6C:
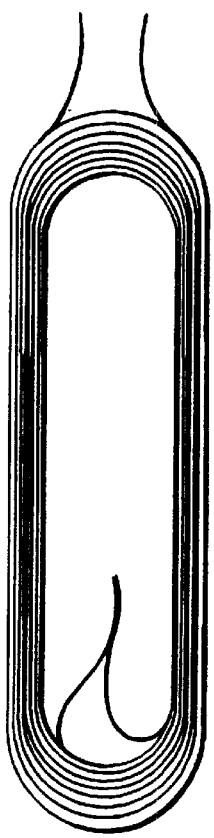
FIG. 6C shows the two coils shown in FIG. 6 having their leads joined in the inside of a "racetrack" configuration and thus eliminating the lead cross-over that adds bulk to the coil assembly.
Figure 6B:
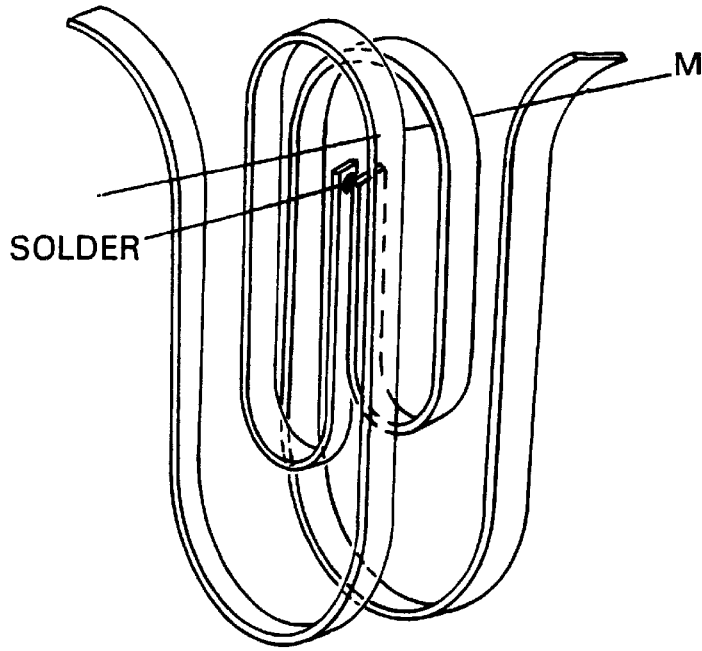
FIG. 6B shows schematically the coils of FIG. 6A brought together and joined at their inner portions.

Referring to FIGS. 6A and 6B, the first coil part 36 and the second coil part 38 are aligned to align the magnetic field H (shown in FIG. 6A for a constant current flowing in each coil). The inner runs of the oppositely wound ribbon coils 36 and 38 are joined in the center part of the "raceway" configuration as shown in FIGS. 6B and 6C. This connection eliminates the lead crossover that otherwise may add bulk to a coil assembly for a stator. Each of the two drive coils 28 has two outside leads (shown in FIGS. 1B, 3 and 6C), which are positioned in the standard way on the composite coil's exterior. Thus each drive coil 28 is formed by at least two oppositely wound and cylindrically deformed coil pancakes.

Figure 1C:
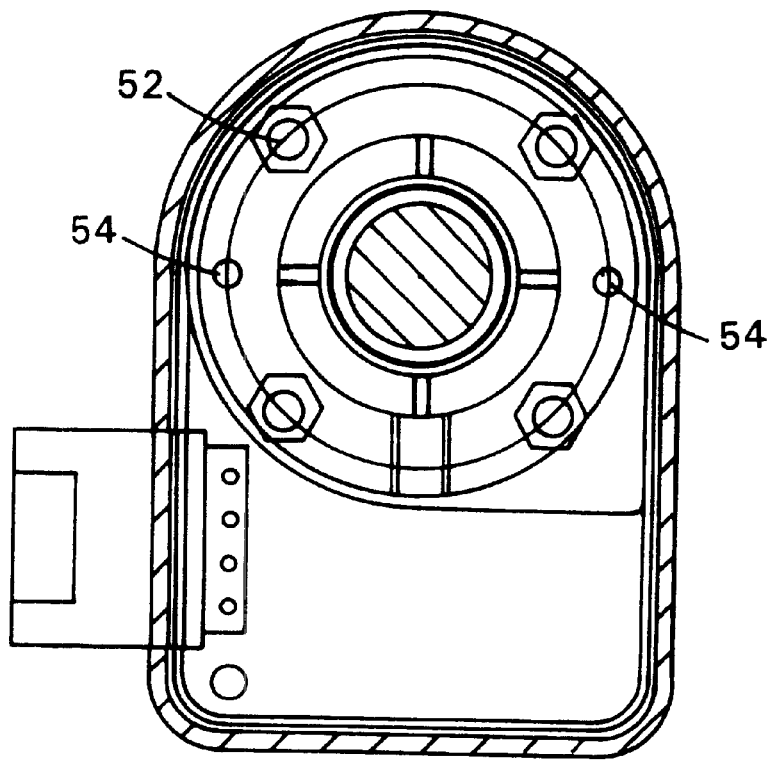
FIG. 1C is an end view of the optical scanner of FIG. 1.
Figure 1B:
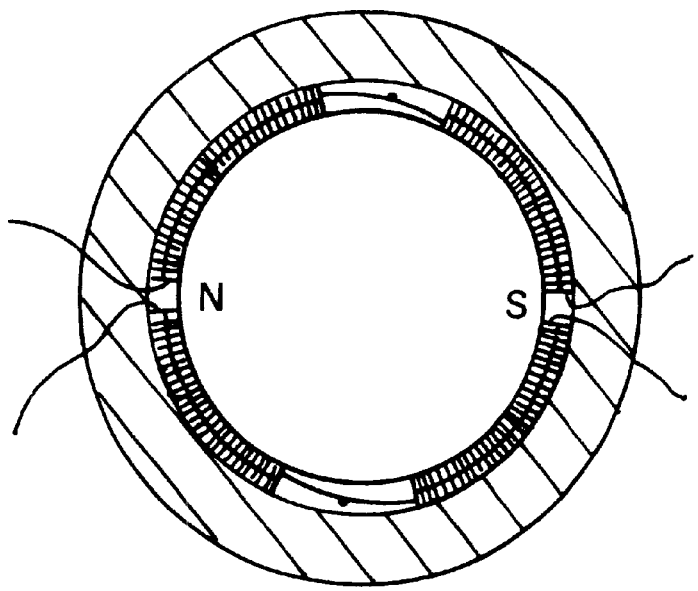
FIG. 1B is a diagrammatic cross-sectional view of a stator assembly of the scanner shown in FIG. 1.
Figure 2:
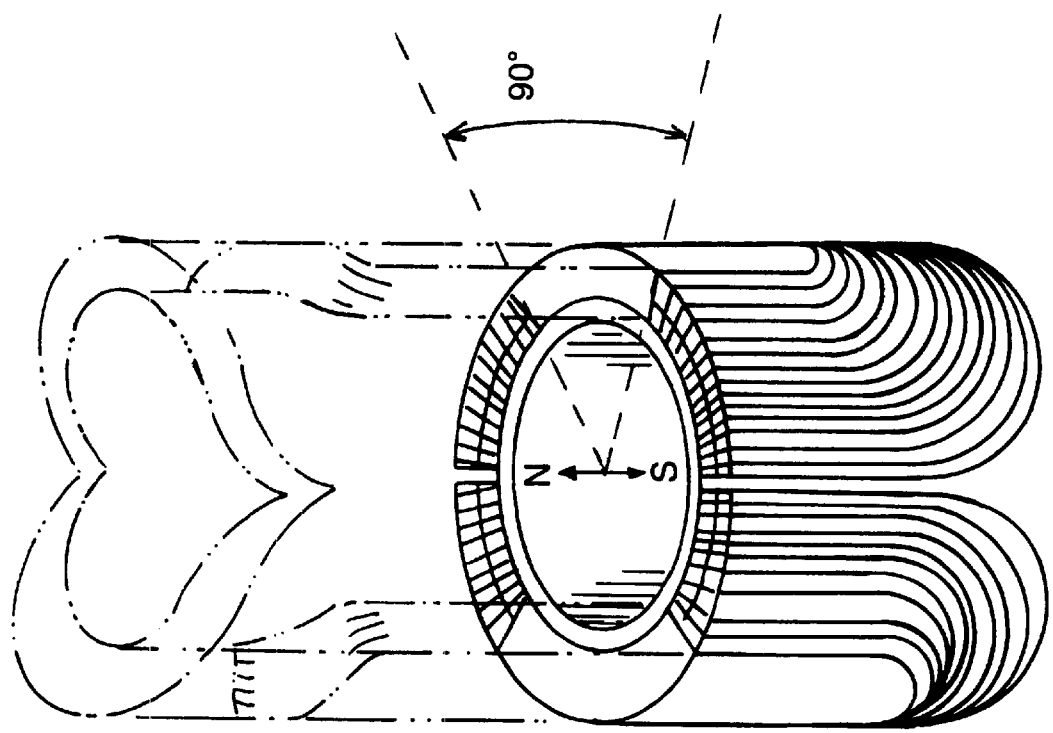
FIG. 2 is a perspective view, including a partial cross-section of the composite coil formed using ribbon conductor.
Figure 3:
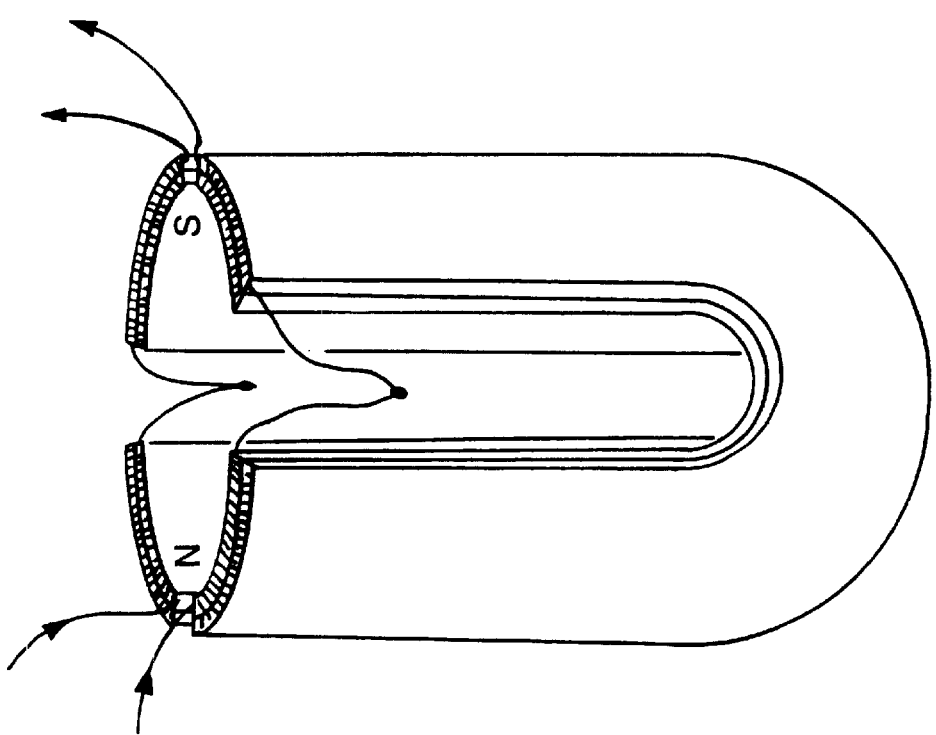
FIG. 3 is a diagrammatic perspective view of the coils shown in FIG. 2 oriented 90° with respect to the position shown in FIG. 2.

FIGS. 1B, 2 and 3 show the rectangular conductors formed by two superposed, deformed pancake coils, for each drive coil 28. Stator 12 includes two composite drive coils 28 with a high packing density. The coils are arranged with respect to the N and S poles of magnet 30. Furthermore, the peripheral turns of both drive coils 28 are spaced apart at a 90-degree angle with respect to the center of magnet 30, as shown in FIG. 2.

The galvanometer is preferably manufactured by forming the above described two pancake coils and shaping two times for the two inner coils, and a similar action is performed for two outer coils using the same bobbin. (Different bobbins and different turn distribution may also be considered) The inner and outer coils are formed using a slightly different guide and punch set in order to form the outer coils with a slightly larger diameter so that the outer coils closely conform to the outer surface of the inner coils when the two are superposed as shown in FIGS. 6 and 6C and described above. The winding direction of the inner and outer coils is in opposite sense (i.e., clockwise and counter-clockwise direction), which enables interconnection of the coils in the open space of the raceway form of the coil shape, and addition of the magnetic field. Each composite coil has the appearance of a standard coil, having only external leads.

During the fabrication process, after each coil part is wound and compressed, the coil parts are heat cured for about 15 seconds. This heating activates the glue deposited on the exterior of ribbon conductor 17. The lead from the inner coil part and the lead from the outer coil part are soldered in the oval space between opposite long ends to make an appropriate permanent electrical connections between the coil parts, as shown schematically in FIG. 6B. The coil parts are then applied one on top of the other on a potting mandrel and, while remaining on the potting mandrel, they are enclosed in a sleeve to form the two driving coils capable of assuming shape 24 of stator sleeve 22 (FIG. 1).

In the next set of steps, a potting compound is introduced to pot the coils together to form a solid unit. After the driving coils are inserted into the sleeve, a bottom and top cap are applied to the potting tool. Appropriate tubing is fixed directly to a hole provided in the sleeve to admit the potting compound at the bottom of the assembly. The sleeve also includes a hole at the top for bleeding the product. Two supply tubes are inserted into the bottom holes and a gravity reservoir filled with epoxy is raised above the unit. By gravity flow, the assembly is filled, from the bottom, until the fluid epoxy flows from the top bleed hole. Another hole in the side of the sleeve at the top is used for the exterior lead wires to exit and provide electrical connection. The two loose wires, coming from the outside of each composite drive coil, serve as conventional connecting leads. After filling the potting tool with epoxy the unit is placed in an oven and cured for several hours, usually overnight.

After the potting is cured the bottom and top pieces of the potting fixture are removed and pushed out. Subsequently, the potting mandrel is removed, and the coil unit can receive rotor 10. The potting action provides a thin cylindrical layer of potting compound between the coils and the potting mandrel. This layer has a thickness of about 0.010 inch and is useful in preventing the copper conductor from corroding and for providing structural integrity to the drive coils.

Referring again to FIG. 1, according to a test embodiment, the galvanometer included rotor magnet 30 having a diameter of 0.50 inches and a length of 1.968 inches. Solid magnet 30 was made of NdFeB and had the calculated moment of inertia 9.955 gm.cm$^2$. The entire rotor had the total moment of inertia of 13.241 gm.cm$^2$ The inner diameter of sleeve 22, having inner surface 24, was 0.625 inches. Thus there was a gap of 0.0625 inches (0.158 cm) between magnet 30 and inner surface 24. Each coil part was made of a ribbon wire having thickness t=0.0065 to 0.007 inch and width w=0.024 to 0.025 inch. Each drive coil had 55 turns and resistance of 1.4 ohm, and thus the entire coil insert had the total number of 110 turns and the resistance of 2.8 ohms. In this design, for a peak power of 50 W, there is a current of 5.976 Amps flowing in each coil. The torque constant is calculated to be about 720 g.cm/A for a 0.9 Tesla magnet made of NdFeB. The measured torque constant is about 650 g.cm/A.

To assemble the entire unit, the stator leads are provided with connectors. The rotor is magnetized and front bearing 27 is installed and bonded in place through stator sleeve 22. A fixture cap is then temporarily attached through sleeve 22 to keep the bearing in place temporarily. The rotor is then inserted from the back until it seats into the front bearing. Subsequently, preload washer 25 is installed over the rotor, following which rear bearings 26 are locked on. The outer race of bearing 26 is assembled onto the rotor and into the sleeve. A preload is then applied and the assembly is left to cure overnight.

After completing the torque set assembly, the temporary front plate is removed and base plate 50 of position detector 14 is attached. Simultaneously, two alignment pins 54 (shown in FIG. 1C) are installed into sleeve 22.

The base driver board for position detector 14 is installed in four steps using alignment pins. The butterfly 58 of the position detector, a dielectric member, is installed over the shaft. At this point, an alignment and spacing fixture is installed on the position detector assembly. This completed assembly is then installed in a clocking fixture that engages a null pin that passes through the shaft, through the rear side of the rotor 10. Clocking fixture is set to have the magnet in the magnetic null position. The magnetic null position is found by first applying plus power to the coils and letting the rotor rotate to a position and measuring on the dial disk this position of the rotor. Then, minus power is applied and the rotor swings approximately 180° to a second position noted on the disk. Then, the position on the disk midway between the two readings is noted and the rotor is clamped in place at the magnetic null position thus determined. At that point, the D bore of the position detector is installed over the fixture which spaces and clocks the butterfly dielectric.

Then, a bonding agent is admitted around the shaft where the position detector is located to secure the assembly. A weight is installed over the shaft within the hole that is in the position detector above the butterfly. This presses the butterfly onto the clocking and spacing fixture which in turn is pressed onto the base driver board so that they are accurately located. This spaces the butterfly properly between the base driver board and the position detector board and, because the same fixture also has a clocking feature, it also sets the butterfly at the magnetic null position. The magnetic design of the position detector and base driver board is such that the electrical null of that circuit is coincident with the magnetic null of the torque assembly. The assembly is cured overnight. Subsequently, the clocking spacing fixture is pulled out, leaving the butterfly permanently affixed both in the electrical and in the magnetic positions. As the final step, a cover is installed.

What is claimed is:

1. A method for making a composite electromagnetic drive coil for a moving magnet galvanometer comprising the acts of:
    winding two flat pancake-shaped coil parts using a rectangular conductor having a width and a thickness, said winding including forming each pancake-shaped coil part having said width oriented in a direction approximately normal to a face of said pancake-shaped coil part;
    forming each said pancake-shaped coil part to a selected shape different from said initially flat shape;
    superposing two said coil parts; and
    electrically connecting said superposed coil parts to form a single unit.

2. The method of claim 1 further including potting said superposed coil parts.

3. The method of claim 1 wherein said forming includes employing a cylindrical mandrel.

4. The method of claim 1 forming includes employing one cylindrical mandrel for each said coil part having a slightly different shape.

5. The method of claim 1 wherein said superposing includes aligning said coil parts in an orientation adding magnetic fields together.

6. The method of claim 5 wherein said connecting is performed between inner turns of each of the coil parts to locate a connection within the bounds of said composite coil without crossing.

7. A method for making a stator of a moving magnet galvanometer comprising:

fabricating a first composite electromagnetic drive coil including winding two flat pancake-shaped coil parts using a rectangular conductor having a width and a thickness, said winding including forming each pancake-shaped coil part having said width oriented in a direction approximately normal to a face of said pancake-shaped coil part, forming each said pancake-shaped coil part to a selected shape different from said initially flat shape, superposing two said coil parts, and electrically connecting said superposed coil parts to form a first packed unit;

fabricating a second composite electromagnetic drive coil including winding two flat pancake-shaped coil parts using a rectangular conductor having said width and said thickness, said winding including forming each pancake-shaped coil part having said width oriented in a direction substantially normal to a face of said pancake-shaped coil part, forming each said pancake-shaped coil part to said selected shape different from said initially flat shape, superposing two said coil parts, and electrically connecting said superposed coil parts to form a second packed unit; and potting said first packed unit and said second packed unit.

8. The method of claim 7 wherein said forming includes employing a cylindrical mandrel.

9. The method of claim 7 forming includes employing one cylindrical mandrel for each said coil part having a slightly different shape.

10. The method of claim 7 wherein said superposing includes aligning said coil parts in an orientation adding magnetic fields together.

11. The method of claim 10 wherein said connecting is performed between inner turns of each of the coil parts to locate a connection within the bounds of said composite coil without crossing.

12. A moving magnet galvanometer including a composite electromagnetic coil comprising two pancake-shaped coil parts using a rectangular conductor having a width and a thickness, said coil being formed by said pancake-shaped coil part having said width oriented in a direction approximately normal to a face of said pancake-shaped coil part, each said pancake-shaped coil part being subsequently shaped to a shape different from an initially flat shape; said coil parts being superposed and electrically connected to form a single tightly packed unit.

13. The moving magnet galvanometer of claim 12 wherein said composite electromagnetic coil conforms to a predetermined space used for installation.

14. The moving magnet galvanometer of claim 12 wherein said composite electromagnetic coil is made of said rectangular conductor having said width and thickness in the range of about 1 to 1 and 6 to 1.

15. The moving magnet galvanometer of claim 12 wherein said composite electromagnetic coil is made of said rectangular conductor having said width and thickness in the range of about 3 to 1 and 5 to 1.

16. The moving magnet galvanometer of claim 12 wherein said composite electromagnetic coil is made of said rectangular conductor having an adhesive on its outer surface.

17. The moving magnet galvanometer of claim 12 wherein said composite electromagnetic coil is surrounded by a potting compound.

18. In a moving magnet galvanometer, a stator including a composite coil comprising a rectangular conductor having a width and a thickness oriented in a direction approximately normal to a face of said coil, said coil having a semi-cylindrical shape to fit a cylindrical shape of a rotor and including at least two parts electrically connected to form a single tightly packed unit.

19. The stator of claim 18, wherein said composite coil includes two halves each including at least two coil parts having a uniform turn density.

20. The moving magnet galvanometer of claim 19 wherein said composite electromagnetic coil is made of said rectangular conductor having an adhesive on its outer surface.

21. The stator of claim 18, wherein said composite coil includes at least two parts shaped to a shape different from an initially flat shape.

22. The moving magnet galvanometer of claim 21 wherein said composite electromagnetic coil is made of said rectangular conductor having an adhesive on its outer surface.

23. The moving magnet galvanometer of claim 21 wherein said composite electromagnetic coil is made of said rectangular conductor having said width and thickness in the range of about 1 to 1 and 6 to 1.

24. The moving magnet galvanometer of claim 21 wherein said composite electromagnetic coil is made of said rectangular conductor having said width and thickness in the range of about 3 to 1 and 5 to 1.

* * * * *

UNITED STATES PATENT AND TRADEMARK OFFICE
CERTIFICATE OF CORRECTION

PATENT NO. : 6,531,864 B2  Page 1 of 2
DATED : March 11, 2003
INVENTOR(S) : Jean I. Montagu It is certified that error appears in the above-identified patent and that said Letters Patent is hereby corrected as shown below:

<u>Title page,</u>
Item [56], U.S. PATENT DOCUMENTS, please insert the following documents:

| | | | |
|---|---|---|---|
| -- 4,076,998 | 02/28/78 | Montagu | 318/132 |
| 4,433,261 | 02/21/84 | Nashiki et al | 310/156 |
| 4,465,950 | 08/14/84 | Guttinger | 310/162 |
| 4,473,764 | 09/25/84 | White | 310/91 |
| 4,866,324 | 09/12/89 | Yuzawa et al | 310/268 |
| 5,121,020 | 06/09/92 | Bertram et al | 310/156 |
| 5,313,127 | 05/17/94 | Danley et al | 310/36 |
| 5,424,632 | 06/13/95 | Montagu | 324/146 |
| 5,528,095 | 06/18/96 | Strobl | 310/156 |
| 5,627,423 | 05/06/97 | Marioni | 310/156 |
| 5,710,44 | 01/2098 | Mulgrave | 310/254 |
| 3,619,028 | 11/09/71 | Keene et al | 350/7 |
| 4,314,154 | 02/02/82 | Minoura et al | 250/235 |
| 4,370,019 | 01/25/83 | Shirasaki | 350/6.6 |
| 4,631,581 | 12/23/86 | Carlsson | 358/93 |
| 4,788,423 | 11/29/88 | Cline | 250/235 |
| 4,859,846 | 08/22/89 | Burrer | 250/234 |
| 4,874,215 | 10/17/89 | Montagu | 350/6.6 |
| 4,919,500 | 04/24/90 | Paulsen | 350/6.6 |
| 4,959,568 | 09/25/90 | Stokes | 310/51 |
| 4,975,626 | 12/04/90 | Yagi et al | 318/567 |
| 5,032,720 | 07/16/91 | White | 250/236 |
| 5,048,904 | 09/17/91 | Montagu | 359/202 |
| 5,130,838 | 07/14/92 | Tanaka et al | 359/200 |
| 5,144,477 | 09/01/92 | White | 359/368 |
| 5,936,324 | 08/10/99 | Montagu | 310/156 |
| 5,235,180 | 08/10/93 | Montagu | 250/231.13 |
| 5,225,923 | 07/06/93 | Montagu | 359/199 |
| 5,225,770 | 0706/93 | Montagu | 324/146 |
| 5,169,050 | 12/08/92 | Montagu | 228/4.5 |
| 5,150,249 | 09/22/92 | Montagu | 359/202 |
| 5,099,386 | 03/24/92 | Stokes et al | 361/298 |
| 4,694,212 | 09/15/87 | Montagu | 310/90 |
| 4,655,543 | 04/07/87 | Montagu | 350/6.6 |
| 4,528,533 | 07/09/85 | Montagu | 335/230 |
| 4,525,030 | 06/25/85 | Montagu et al | 350/255 |

UNITED STATES PATENT AND TRADEMARK OFFICE
CERTIFICATE OF CORRECTION

PATENT NO.    : 6,531,864 B2
DATED         : March 11, 2003
INVENTOR(S)   : Jean I. Montagu It is certified that error appears in the above-identified patent and that said Letters Patent is hereby corrected as shown below:

Title page (cont'd),

| | | | |
|---|---|---|---|
| 4,502,752 | 03/05/85 | Montagu | 350/6.6 |
| 4,462,014 | 07/24/84 | Montagu | 335/230 |
| 4,370,613 | 01/25/83 | Montagu | 324/154R |
| 4,329,606 | 05/11/82 | Montagu | 310/71 |
| 4,186,332 | 01/29/80 | Montagu | 318/128 |
| 4,185,215 | 01/22/80 | Montagu | 310/83 |
| 3,970,979 | 07/20/76 | Montagu | 335/229 |
| 3,959,673 | 05/25/76 | Montagu | 310/38 |
| 3,624,574 | 11/30/71 | Montagu | 335/230 |
| 4,543,708 | 10/01/85 | Matsubara et al | 29/598 |
| 3,528,171 | 09/15/70 | Houtman | 29/596 |
| 3,348,183 | 10/17/67 | Hodges et al | 336/223 |
| 5,537,109 | 07/16/96 | Dowd | 340/870.37 |

Signed and Sealed this

Second Day of September, 2003

JAMES E. ROGAN
*Director of the United States Patent and Trademark Office*